United States Patent

[11] 3,604,867

| [72] | Inventor | Masaru Suzuki<br>Hekikai-gun, Japan |
|---|---|---|
| [21] | Appl. No. | 879,435 |
| [22] | Filed | Nov. 24, 1969 |
| [45] | Patented | Sept. 14, 1971 |
| [73] | Assignee | Kabushiki Kaisha Tokai Rika Denki<br>Seisakusho<br>Nishikasugai-gun, Japan |
| [32] | Priority | Nov. 25, 1968 |
| [33] | | Japan |
| [31] | | 43-103079 |

[54] RELEASE DEVICE FOR DIRECTIONAL INDICATOR SWITCH
7 Claims, 7 Drawing Figs.

[52] U.S. Cl. .................................................. 200/61.34
[51] Int. Cl. .................................................. H01h 3/16
[50] Field of Search .............................. 200/61.27–61.38, 61.54

[56] References Cited
UNITED STATES PATENTS

| 2,284,936 | 6/1942 | Wilhusen | 200/61.34 |
| 2,542,242 | 2/1951 | Fuller | 200/61.34 |
| 3,197,586 | 7/1965 | Schmidt | 200/61.34 |
| 3,408,467 | 10/1968 | Shenstone et al. | 200/61.27 |

Primary Examiner—J. David Smith
Assistant Examiner—M. Ginsburg
Attorney—Woodhams, Blanchard and Flynn ABSTRACT: An automatic release device for a vehicle directional switch indicator mechanism, wherein a frame member is disposed in surrounding relationship to the steering shaft and a support member or bracket is movably mounted on the frame and is connected to manual actuating lever. The support member is spring biased into a neutral position and is displaceable in opposite directions into operative positions which cause closing of suitable switches to indicate suitable vehicle turn signals. The support member has a further ratchet support element mounted thereon which has a pair of pivotal ratchets mounted adjacent opposite ends thereof and disposed for coaction with suitable pins secured to the steering axle. The ratchet support member is floatably mounted for limited movement relative to the bracket and the ratchet support member has suitable stop members which coact between the frame and the bracket for permitting the bracket to be returned to its neutral position when the steering axle is likewise returned to its original position.

3,604,867

RELEASE DEVICE FOR DIRECTIONAL INDICATOR SWITCH

This invention relates to a release device for a vehicle directional indicator switch mechanism.

An object of the present invention is to provide an automatic release device in a directional indicator which, when a movable bracket is moved from a neutral position to one of two different operative positions, can retain said movable bracket in said operative position by means for controlling a return motion of the movable bracket and which automatically returns said movable bracket to its initial neutral position by a spring means.

The device of the present invention comprises engaging projections extending on a recessed base part of a frame and engaging with projections on a ratchet supporter; a ratchet support member placed on a movable bracket and having projections adapted for engaging with either of said engaging projections when the movable bracket is moved into one of said operative positions, thereby preventing a return motion of said movable bracket; a pair of ratchets rotatably mounted at both ends of said ratchet support member, one of said ratchets being moved to project its end within the operation range of a cancelling pin provided on the steering axle, when said movable bracket is moved to one of said operative positions, with said ratchet being pushed back by said cancelling pin according to the return rotation of the steering axle, thereby releasing the engagement of the ratchet support member with one of the engaging projections whereby the movable bracket is returned to the neutral position by the action of springs connected between the frame and said bracket.

In the accompanying drawings showing a preferred embodiment of the present invention;

FIGS. 1 and 2 are plan views of a cancelling device, wherein FIG. 1 shows the bracket member in the neutral position and FIG. 2 shows the bracket member in one of the operative positions;

Throughout the drawings, the same portions are indicated with identical reference numerals.

Figure 4:
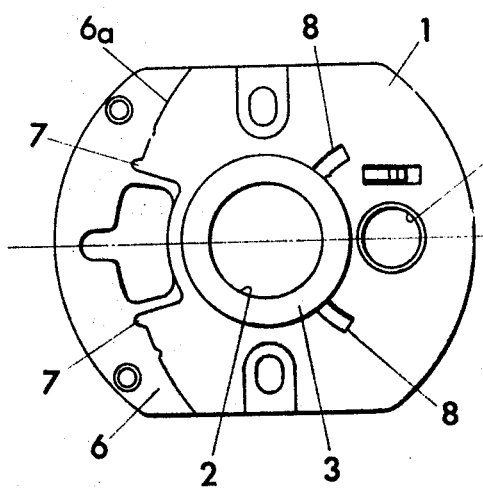
FIG. 4 is an explanatory plan view of the frame.

In FIGS. 1 through 7, numeral 1 indicates a frame member, a top surface of which is shown in FIG. 4 with other elements removed. An annular recessed base portion 3 is provided around a central bore 2 into which a steering shaft is inserted, which steering shaft has suitable pins 36 thereon which rotate around the hub portion 3. On the central line 4 extending through the center of the said aperture 2, another axle aperture 5 is provided for receiving a tubular axle 13. On one end opposite to the axle aperture 5 a recessed base portion 6 is formed. On the both sides of said base portion as seen from said central line 4, a pair of engaging projections 7 extend towards said one end of frame. Short projections 8 having an arched shape extend from the circumference of the annular recessed portion 3 towards the other end of the frame. Said short projections form portions of a circle coaxial with the axle bore 5. To one end of each projection 8, a spring is connected when the device is assembled.

Figure 5:
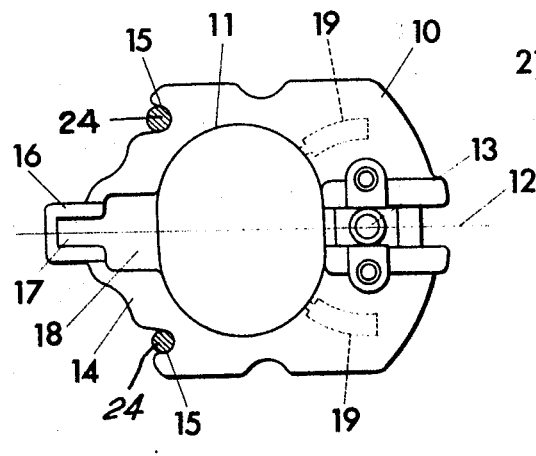
FIG. 5 is an explanatory plan view of the movable bracket.

FIG. 5 shows a movable bracket 10, which includes a tubular axle 13 provided at a position on the extension of the central line 12 of an oblong bore 11 which will be coaxial with the axis of the annular recessed portion 3 of the frame 1 when the bracket 10 is mounted on the frame, and downwardly extending; a portion 14 for carrying a ratchet support member 20 (FIG. 6), which portion 14 is located at one end opposite to the tubular axle 13 and has a pair of engaging cavities 15 provided at its lateral portions, and a central offset or projection 16 provided with a cavity 17 having one closed end and the other end contiguous to an enlarged cavity 18 extending to the oblong central bore 11. Said movable bracket 10 further includes a pair of arch-shaped slots 19 for accommodating springs which are provided on the reverse or under side thereof and extend from the circumference of the oblong central bore 11 towards the other end of the bracket. Said spring-fitting cavities or slots 19 form an arc which has the same axis with the tube axle 13. The projections 8 can be respectively fitted in each of said cavities 19 at a position near the circumference of said oval aperture 11.

Figure 6:
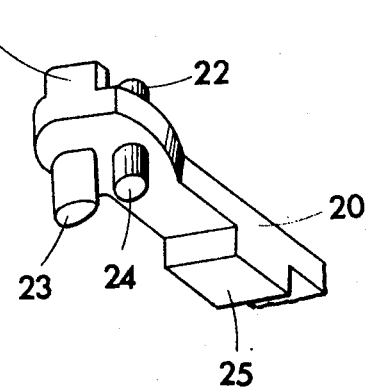
FIG. 6 is a perspective view of a substantial part of the ratchet supporter; and, FIG. 7 is a perspective view of the ratchet.

FIG. 6 shows a ratchet supporter 20, which is a substantially straight plate. Said ratchet supporter 20 includes identical opposite end portions which include stopper projections 21 extending on the upper surface thereof at both ends; ratchet supporting axles 22 provided inwardly of said stopper projections 21; stoppers 23 which are provided on the under surface and each of which is adapted for engaging the lower stepped part 6 of frame 1 at a given spacing from the outer side of each of engaging projections 7; engaging projections 24 which are normally fitted in the engaging cavities 15 of the movable bracket 10; and a central raised portion 25 which is loosely fitted in the enlarged cavity 18.

Figure 1:
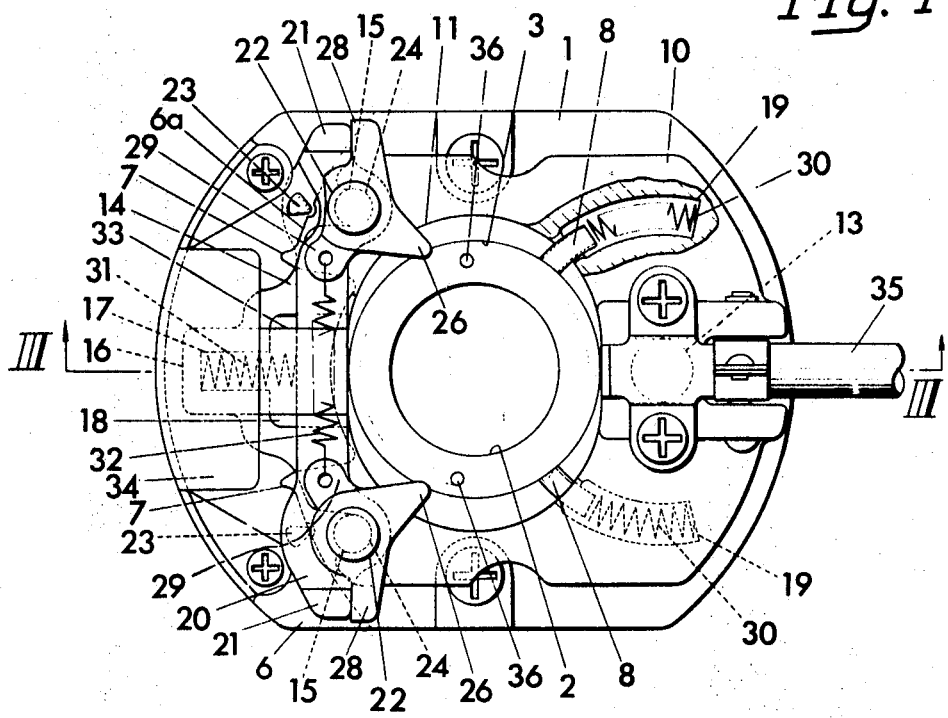
Figure 2:
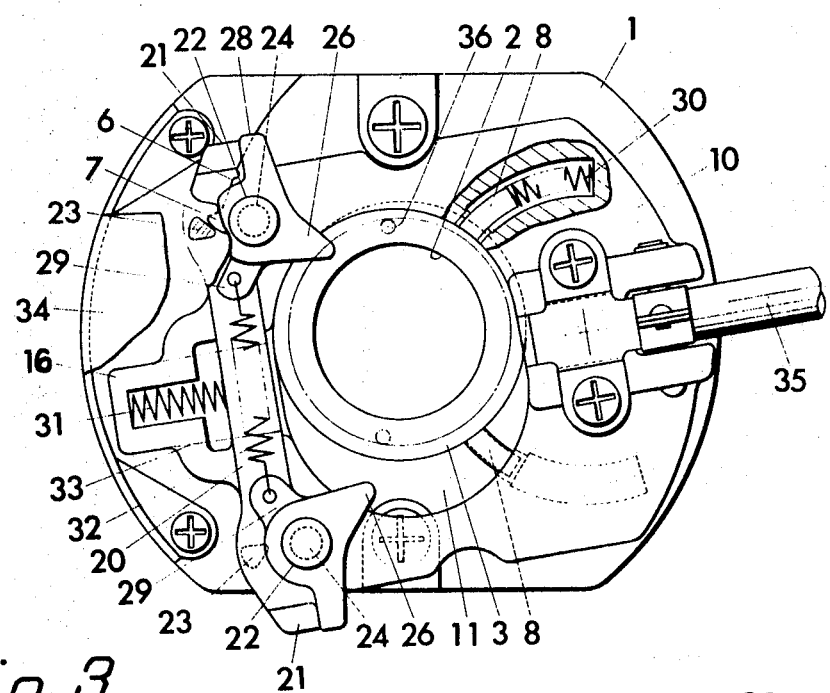
Figure 3:
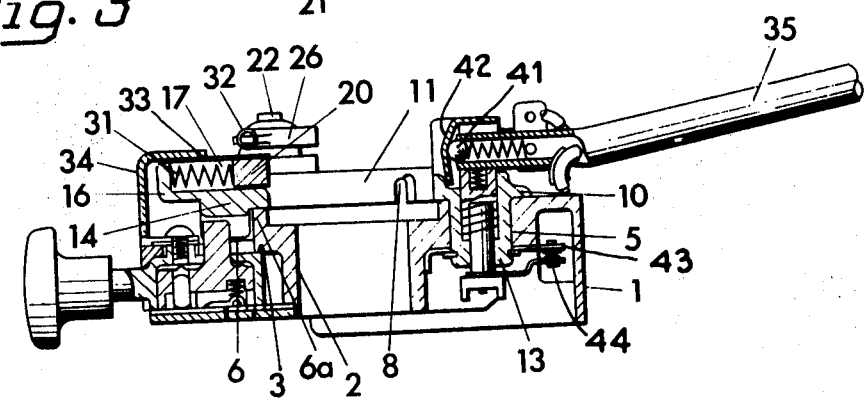
FIG. 3 is an explanatory transverse sectional view taken along the line III—III of FIG. 1.
Figure 7:
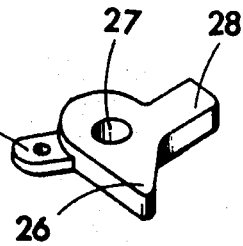

FIG. 7 shows a ratchet 26, which includes an axle aperture 27 into which the axle 22 is fitted; a stopper 28 which extends outwardly of the ratchet and engages the stopper projection 21 and spring hook 29 which extends inwardly in FIG. 1 or 2 confronting that of another ratchet when assembled on the frame.

In the construction as described, the movable bracket 10 is rotatably mounted on the frame 1 with the tubular axle 13 fitted loosely into the axle bore 5 of the frame 1. A pair of return springs 30 are fitted into the slots or cavities 19 and connected to the projections 8 of the frame 1 which extend within the end portions of said spring-fitting cavities 19. Thus, the movable bracket 10 is normally maintained by springs 30 in a neutral position such that the central line 12 of said bracket 10 is parallel and coplanar with the central line 4 of the frame 1. The ratchet supporter 20 is simply laid on the carrying part 14 of the movable bracket 10 so that raised portion 25 extends into recess 18 and pins 24 extend into the recesses 15. The support member 20 is pressed against the steering shaft positioned within bore 2 by the action of a press spring 31 provided in the spring-engaging cavity 17. Said spring 31 causes the projections 24 to engage with the cavities 15, so that the reciprocative motion of the ratchet support member 20 is controlled. Said spring 31 also acts to press the stoppers 23 against the stepped wall or offset 6a of the frame 1 outwardly from the protrusions 7.

The pair of ratchets 26 are mounted on the opposite ends of the ratchet supporter 20 with the supporting axle 22 fitted into the axle aperture 27 and operatively connected by the spring 32 having both ends connected to the spring hooks 29 of respective ratchets. Owing to the action of the spring 32, the stoppers 28 of respective ratchets normally engage with the projections 21 of the ratchet supporter, so that the ratchets 26 are normally maintained so that the pointed or tooth portion of each ratchet faces the circumference of annular lower part 3. Numeral 33 designates a cover placed for protection over the press spring 31, and 34 is a guard member which is fixed to the frame 1 so as to shield the forward end of the movable bracket 10.

The thus constructed device operates as follows.

When the movable bracket 10 is in the neutral position, as is shown in FIG. 1, due to the counteractions of the return springs 30, the ratchets 26 are located out of the operation range of cancelling pins 36 disposed adjacent the annular lower part 3.

The bracket 10 has an actuating lever 35 connected thereto for permitting the bracket to be moved in opposite directions away from said neutral position, thereby permitting the bracket 10 to be selectively displaced into two different operative positions. The lever 35 has a spring-biased ball 41 associated therewith which coacts with stationary cover 42. The lever, when angularly displaced into one of the operative positions causes a contact 43 to be moved into contact with one of a pair of angularly spaced contacts 44 which energize the vehicle turn signals. This switch structure is conventional and thus will not be described in detail.

When the movable bracket 10 is moved by an actuating lever 35 into one of the operative positions, either upwards or downwards, such as downward as shown in FIG. 2, the return spring 30 located on the side opposite to the displaced direction of the bracket (that is, the upper spring 30 in FIG. 2) is compressed by the projection 8.

On the other hand, the upper stopper 23 as located on the side corresponding to said compressed return spring 30 is moved across the projection 7 into engagement therewith, as shown in FIG. 2, so that said bracket 10 is locked in said position against the resilient action of said upper return spring 30. It is noted that at the time of the motion of said projection 23 crossing the projection 7, the ratchet supporter 20 slightly turns about the lower engaging projection 7 against the action of the spring 31. Hence, the engagement of said upper projection 23 with the upper projection 7 is held by the action of the spring 31. Thus, the upper ratchet 26 is positioned so that its sharp end projects into the turning or operation path of the cancelling pin 36 located on the upper side of hub 3.

When the steering axle is operated in the counterclockwise direction in FIG. 2, said ratchet 26 is pushed by the cancelling pin to turn in the opposite direction against the force of spring 32 so as to permit the cancelling pin 36 to pass by.

After the upper pin 36 has passed by the upper ratchet 26 and the steering axle is operated in the opposite or clockwise direction, the upper cancelling pin 36 contacts said ratchet 26 on its lower side and tries to cause counterclockwise rotation of the ratchet. Since the ratchet stop 28 is engaged with the stop 21, further clockwise rotation of the steering axle causes the ratchet support member to slightly rotate about the lower projection 24 in the counterclockwise direction against the action of the spring 31, so that the engagement of the projection 7 with the upper projection 23 is released, whereby the movable bracket 10 is automatically returned to the neutral position by the action of the upper spring 30.

In the event of an accident where the cancelling pin, when in the return motion, seizes the ratchet 26 to prevent the return rotation of the steering axle, the ratchet support member 20, together with the ratchets 26, is moved in the forward direction on the part 14 against the action of the spring 31 into the initial position, by forcibly moving said steering axle in the returning direction, and thus, the danger that the serious accident occurs can be completely prevented.

The device of the present invention thus ensures the direction indication by the movable bracket, the automatic cancellation by the cancelling pins, and a rapid release of the cancelling pin from the ratchet in the event that they are bitten into each other. And another advantage of the device of the present invention is that the various components are assembled preliminarily into respective blocks such as the frame, the movable bracket and the ratchet support member, and subsequently these three blocks are assembled one upon another by incorporating other components such as springs so that an assembly line operation is favorably adaptable.

What is claimed is:

1. A direction-indicating apparatus for use with cancelling pins secured to a steering axle and movable in an orbital path, comprising:
   a support member having a central bore for receiving said steering axle;
   an actuating member having a support axle and a steering axle bore;
   means for connecting said actuating member to said support member for movement relative thereto from a neutral position to one of two operating positions;
   said support member being provided with a recessed base portion adjacent one end thereof and a support bore adjacent the other end thereof for receiving said support axle of said actuating member, said support member also having a pair of engaging projections extending toward said recessed base portion;
   said means for connecting said actuating member to said support member including an elongated ratchet support member mounted on said actuating member at a position remote from said support axle and spring means urging said ratchet support member toward said axle bore;
   said ratchet support member being provided with a pair of projections extending towards said recessed base portion of the support member and adapted to engage with one of said engaging projections in accordance with movement of said actuating member into one of said operating positions for holding said actuating member in said one operating position;
   a pair of ratchets pivotally mounted adjacent opposite ends of said ratchet support member and operatively connected with each other by a spring connected therebetween for resiliently urging said ratchets into a position wherein one ratchet projects into the path of movement of one of the cancelling pins when the actuating member is in one of said operating positions, whereby said one ratchet is pushed by said one cancelling pin to release said ratchet support member from said one engaging projection during return motion of said steering axle to release said actuating member from said one operating position; and
   further spring means coacting between said support member and said actuating member for resiliently urging said actuating member toward said neutral position.

2. A directional indicating device adapted to be disposed in surrounding relationship to a steering axle, said axle having release pins mounted thereon for rotation with said steering axle and disposed for coaction with said indicating apparatus, said apparatus comprising:
   frame means having a bore therethrough for receiving therein said steering axle, said frame means having a pair of projections disposed adjacent one end thereof;
   an actuating member movably supported on said frame means, said frame means and said actuating member having cooperating pivot means disposed adjacent the other end of said frame means for enabling said actuating member to pivotally swing relative to said frame means, said actuating member also having a central bore therein adapted to be substantially aligned with the bore formed in said frame means for enabling said steering axle to extend therethrough;
   coacting means disposed for engagement with said frame means and said actuating member for permitting relative movement therebetween, said coacting means permitting said actuating member to be angularly moved between two extreme operating positions, said coacting means including spring means normally resiliently urging said actuating member into a neutral position disposed between said two operating positions;
   an elongated support member movably mounted on said actuating member adjacent said one end of said frame means, and resilient means coacting between said support member and said actuating member for normally maintaining same in a determined position;
   first and second ratchets pivotally mounted on said support member adjacent the opposite ends thereof and biasing means coacting with said ratchets for normally maintaining said ratchets in a position whereby a portion of each of said ratchets projects inwardly toward said bore, said ratchets when said actuating member is in said neutral position being displaced radially outwardly from the path of movement of said release pins;
   projection means secured to said support member and disposed for coaction with the projections formed on said frame means when said actuating member is moved to one of said operating positions for releasably retaining said actuating member in said one operating position, one of said ratchets projecting inwardly to intersect the path of movement of one of the release pins when said actuating member is retained in said one operating position; and means, including said biasing means, coacting with said ratchet for enabling free pivotal movement of said ratchet when said one release pin contacts same and moves therepast to enable said actuating member to be maintained in said one operating position, said last-mentioned means including a fixed stop disposed in abutment with said ratchet for preventing free pivotal movement of said ratchet in the opposite direction whereby rotational movement of said one release pin in said opposite direction causes displacement of said support member against the urging of said resilient means whereby said projection means on said support member disengages said projection on said frame means, thereby permitting said spring means to return said actuating member to said neutral position.

3. An apparatus according to claim 2, wherein the bore formed in said actuating member is elongated in one direction to enable said actuating member to angularly move relative to said steering axle and relative to said frame means, and said frame means and said actuating member having cooperating angular projections and slots formed therein with said spring means being disposed in said slots for resiliently urging said actuating member toward said neutral position, said slots being concentric with said pivot means.

4. An apparatus according to claim 1, wherein said support member and said pivot means are disposed on diametrically opposite sides of the bore formed in said actuating member, and said support member being elongated in a direction substantially transverse to a central plane extending between said pivot means and said support member.

5. An apparatus according to claim 4, wherein said support member has said ratchets pivotally disposed adjacent one side thereof, said ratchets being interconnected by a common spring for resiliently urging said ratchets in opposite rotational directions, and said projection means comprising a first pair of projections extending downwardly from the other side of said support member and disposed adjacent the opposite ends of said support member for coacting with the pair of projections formed on said frame means to enable said actuating member and said support member to be releasably maintained in either of said operating positions, said support member also having a pair of pivot pins extending downwardly from said other side thereof and disposed for coaction with recesses formed in said actuating member for enabling said support member to pivotally move relative to said actuating member in opposition to the urging of said resilient means when said release pins release said actuating member from said operating position.

6. An apparatus according to claim 5, wherein said resilient means includes a spring coacting between said actuating member and said support member, said spring engaging said support member approximately midway between said pair of pivot pins.

7. An apparatus according to claim 5, wherein said support member also has stop members fixedly secured adjacent opposite ends thereof and disposed for coaction with said ratchets, said ratchets being normally resiliently urged in engagement with said stop members.